United States Patent
Yoshida

(10) Patent No.: US 10,642,064 B2
(45) Date of Patent: May 5, 2020

(54) THREE-DIMENSIONAL DISPLAY

(71) Applicant: NATIONAL INSTITUTE OF INFORMATION AND COMMUNICATIONS TECHNOLOGY, Koganei-shi, Tokyo (JP)

(72) Inventor: Shunsuke Yoshida, Koganei (JP)

(73) Assignee: NATIONAL INSTITUTE OF INFORMATION AND COMMUNICATIONS TECHNOLOGY, Koganei-shi (JP)

( * ) Notice: Subject to any disclaimer, the term of this patent is extended or adjusted under 35 U.S.C. 154(b) by 17 days.

(21) Appl. No.: 16/301,529

(22) PCT Filed: May 11, 2017

(86) PCT No.: PCT/JP2017/017905
§ 371 (c)(1),
(2) Date: Nov. 14, 2018

(87) PCT Pub. No.: WO2017/199854
PCT Pub. Date: Nov. 23, 2017

(65) Prior Publication Data
US 2019/0293953 A1    Sep. 26, 2019

(30) Foreign Application Priority Data

May 17, 2016   (JP) .................................. 2016-098464

(51) Int. Cl.
*G02B 30/56*    (2020.01)
*H04N 13/39*    (2018.01)
(Continued)

(52) U.S. Cl.
CPC ............... *G02B 30/56* (2020.01); *G02B 3/00* (2013.01); *G02B 3/08* (2013.01); *G02B 30/00* (2020.01);
(Continued)

(58) Field of Classification Search
CPC .......... G02B 30/56; G02B 30/00; G02B 3/00; G02B 3/08; H04N 13/30; H04N 13/39; G03B 35/20
(Continued)

(56) References Cited

U.S. PATENT DOCUMENTS

| 2010/0103333 | A1  | 4/2010 | Chang et al. |
| 2012/0146897 | A1* | 6/2012 | Yoshida ................ H04N 13/39 345/156 |

FOREIGN PATENT DOCUMENTS

| JP | 2011-48273 A | 3/2011 |
| JP | 2013-21522 A | 1/2013 |

(Continued)

OTHER PUBLICATIONS

International Search Report dated Jul. 25, 2017, issued in counterpart International Application No. PCT/JP2017/017905 (2 pages).
(Continued)

*Primary Examiner* — Amare Mengistu
*Assistant Examiner* — Gloryvid Figueroa-Gibson
(74) *Attorney, Agent, or Firm* — Westerman, Hattori, Daniels & Adrian, LLP

(57) ABSTRACT

A three-dimensional display, wherein an area in which eyes of observers are to be positioned when the observers observe a three-dimensional image is predefined as a viewing area, the viewing area is defined to be circular and surround a light ray controller at a position farther upward than a top board of a table, a light ray group is emitted to an outer peripheral surface of the light ray controller from a light ray generator (Continued)

arranged below the top board, and the light ray controller is formed such that the plurality of light rays emitted to a plurality of portions that are different from one another and arranged in a ridge line direction are transmitted through the plurality of portions while respectively being diffused in a virtual plane, and is formed such that center lines of a plurality of transmitted diffused light rays pass through the viewing area.

5 Claims, 10 Drawing Sheets

(51) Int. Cl.
- *G03B 35/20* (2006.01)
- *H04N 13/30* (2018.01)
- *G02B 3/00* (2006.01)
- *G02B 3/08* (2006.01)
- *G02B 30/00* (2020.01)

(52) U.S. Cl.
 CPC ............. *G03B 35/20* (2013.01); *H04N 13/30* (2018.05); *H04N 13/39* (2018.05)

(58) Field of Classification Search
 USPC .............................................................. 345/6
 See application file for complete search history.

(56) References Cited

FOREIGN PATENT DOCUMENTS

| | | |
|---|---|---|
| JP | 5187639 B2 | 4/2013 |
| JP | 2013-210591 A | 10/2013 |
| JP | 2015-232626 A | 12/2015 |
| JP | 2016-18118 A | 2/2016 |
| WO | 2012/073362 A1 | 6/2012 |

OTHER PUBLICATIONS

S. Yoshida, "Implementations toward Interactive Glasses-free Tabletop 3D Display", National Institute of Information and Communications Technology (NICT), (2014), (1 page).

Office Action dated Sep. 11, 2019, issued in counterpart JP Application No. 2016-098464, with English translation (4 pages).

\* cited by examiner

F I G. 1 2
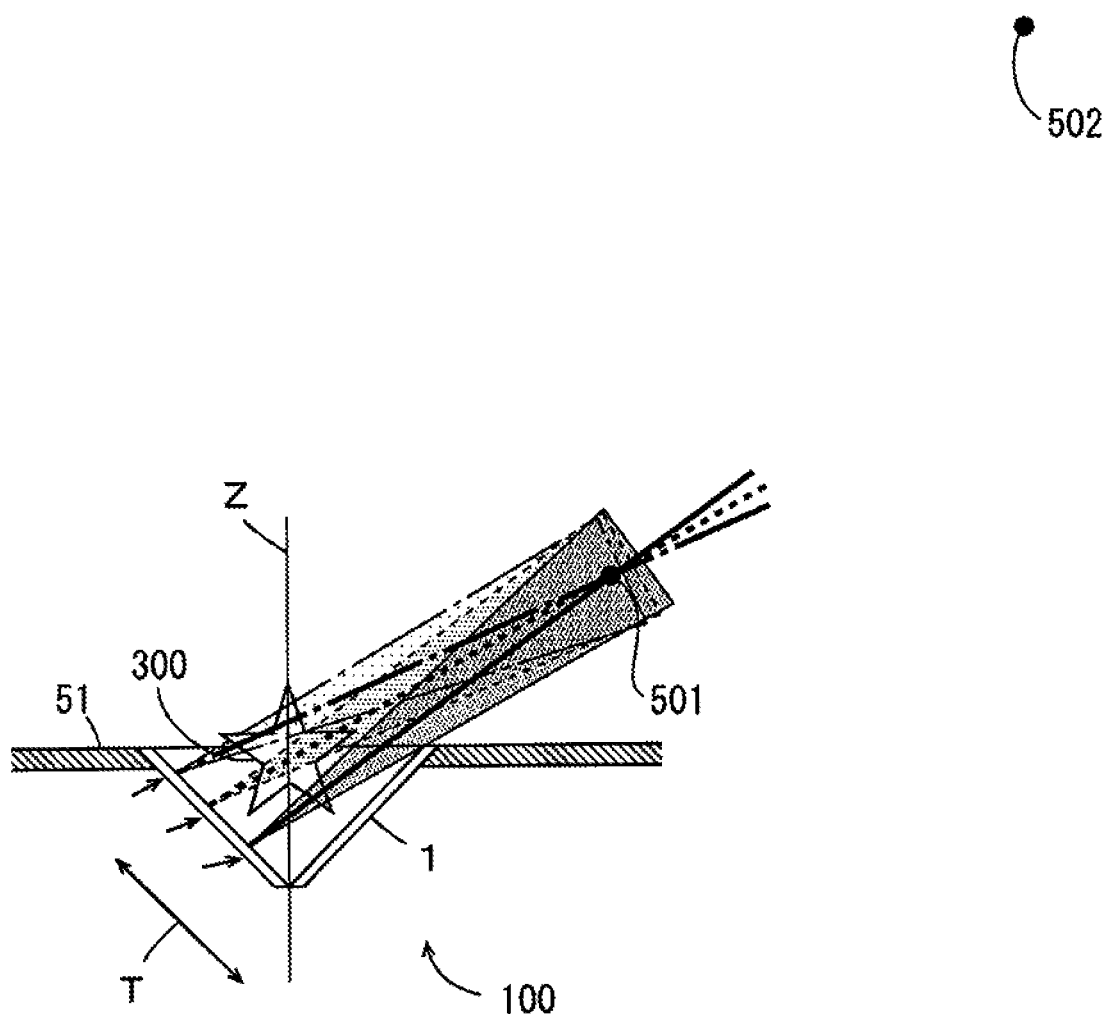

THREE-DIMENSIONAL DISPLAY

TECHNICAL FIELD

The present invention relates to a three-dimensional display with which a three-dimensional image can be observed.

BACKGROUND ART

Various three-dimensional displays for presenting three-dimensional images have been developed (see Patent Document 1, for example.) Generally, a three-dimensional image is presented to a space in front of a screen, a space above the screen or the like in a three-dimensional display.

The three-dimensional display described in Patent Document 1 has a light ray controller having a conic shape. The light ray controller is arranged such that the base of the conic shape is open on a reference plane. A rotation base to which a plurality of scanning projectors are fixed is provided below the reference plane. Each scanning projector irradiates an outer peripheral surface of the light ray controller with a light group including a plurality of light rays from outside of the light ray controller while rotating about a rotation axis on the rotation base. Each light ray emitted by each scanning projector is transmitted by the light ray controller while being diffused in a ridge line direction and is transmitted by the light ray controller while not being diffused in a circumferential direction. Thus, a three-dimensional image is displayed above and inside of the light ray controller having the conic shape.

The light ray group to be emitted by each scanning projector is controlled by a control device such that the three-dimensional image is displayed when observers view above and inside of the light ray controller from a predefined area (viewing area) around the light ray controller.

[Patent Document 1] JP 2011-48273 A

SUMMARY OF INVENTION

Technical Problem

When the light rays emitted to the light ray controller are transmitted through the light ray controller while being diffused in the ridge line direction, the area from which the three-dimensional image can be viewed is enlarged. Therefore, with the above-mentioned three-dimensional display, even when the eyes of the observers are outside of the viewing area, the observers can view at least part of the three-dimensional image.

However, in the above-mentioned three-dimensional display, the three-dimensional image is presented assuming that the eyes of the observer are in the viewing area. Therefore, when the eyes of the observer are outside of the viewing area, the observer cannot view the three-dimensional image based on the accurate perspective projection. That is, the observer views a three-dimensional image that is distorted from the three-dimensional image that is originally to be viewed. Further, with the eyes of the observer outside of the viewing area, part of the three-dimensional image may not be viewed by the observer. In these cases, depending on the three-dimensional image, the observer cannot identify that they are not viewing the three-dimensional image accurately.

Patent Document 1 describes that the positions of the eyes of the observer are tracked by a camera, and a light ray group is corrected by the control device such that an accurate three-dimensional image is viewed from the positions of the eyes. In this case, the process to be performed by the control device becomes complicated. Therefore, high processing capacity is required for the control device, and the three-dimensional display becomes expensive.

Further, with the above-mentioned method, after all of an imaging process performed by the camera, a process of transferring the acquired image data from the camera to the control device, a process of detecting the positions of the eyes from the image data, and a process of correcting the light ray group based on the positions of the eyes are performed, a three-dimensional image is presented. Therefore, when a series of processes from the imaging process to the presentation of the three-dimensional image requires a long period of time, the observer views incomplete three-dimensional images during the series of processes (a time length during which two or three frames are displayed, for example). There is a limit to a reduction of the time length required for the above-mentioned series of processes even with the control device having high processing capacity.

An object of the present invention is to provide a three-dimensional display capable of allowing an observer to view an accurate three-dimensional image while an increase in cost is prevented.

Solution to Problem (1) A three-dimensional display according to one aspect of the present invention for presenting a three-dimensional image based on three-dimensional data includes a light ray controller that has a conic shape or a columnar shape, and is arranged such that a base of the conic shape or the columnar shape is open on a reference plane, a light ray generator that is arranged to emit a light ray group including a plurality of light rays to an outer peripheral surface of the light ray controller from below the reference plane and outside of the light ray controller, and a control means that controls the light ray generator such that a three-dimensional image is presented by the light ray group generated by the light ray generator based on the three-dimensional data, wherein a circular first viewing area is predefined to surround a center axis of the light ray controller at a position farther upward than the reference plane and further outward than the light ray controller, and the light ray controller is formed such that a plurality of light rays emitted to a plurality of different portions on an intersection line of any virtual plane including the center axis and the light ray controller are transmitted through the plurality of portions while respectively being diffused in the virtual plane, and is formed such that center lines of a plurality of transmitted diffused light rays pass through an intersection point of the virtual plane and the first viewing area.

In this three-dimensional display, the control means controls the light ray generator based on the three-dimensional data. The light ray generator emits the light ray group to the outer peripheral surface of the light ray controller from below the reference plane and outside of the light ray controller based on the control of the control means. Thus, the three-dimensional image that can be viewed from the predefined first viewing area is presented.

In this case, the center lines of the plurality of diffused light rays transmitted through the plurality of portions on the intersection line of any virtual plane and the light ray controller pass through the intersection point of the virtual plane and the first viewing area. Thus, the centers of the plurality of diffused light rays are incident on the eyes of the observers in the first viewing area in a concentrated manner. Further, when the eyes of the observer slightly deviate from the first area, all of the plurality of above-mentioned diffused light rays are incident on the eyes of the observer, and only part of the plurality of diffused light rays is not incident on the eyes of the observers.

Therefore, the observers can view the accurate three-dimensional image clearly with their eyes in the first viewing area. Further, the observers do not view an incomplete three-dimensional image with their eyes outside of the first viewing area. In this case, it is not necessary to perform a complicated process of correcting the three-dimensional image according to the positions of the eyes of the observer in order to allow the observer to view the accurate three-dimensional image. As a result, the observer can view the accurate three-dimensional image while an increase in cost is prevented.

(2) The center line of each diffused light ray may be a straight line passing through a peak position of light intensity distribution in a cross section that is orthogonal to a traveling direction of the diffused light ray.

In this case, the portion having the highest light intensity of the diffused light rays is guided to the first viewing area. Thus, the observer can view the accurate three-dimensional image more clearly with their eyes in the first viewing area.

(3) The light ray controller may have a plurality of protruding strips that are formed to extend in a circumferential direction of the light ray controller and be arranged in a ridge line direction of the light ray controller at at least one of the outer peripheral surface and an inner peripheral surface that have the conic shape or the columnar shape, and the plurality of protruding strips may respectively generate the plurality of diffused light rays while transmitting the plurality of light rays emitted to the plurality of portions on the intersection line.

In this case, the plurality of diffused light rays having the center lines passing through the first viewing area are produced by the plurality of protruding strips of the light ray controller.

(4) The light ray controller may have a plurality of diffusion transmission members formed to extend in a circumferential direction of the light ray controller and be arranged in a ridge line direction of the light ray controller at the outer peripheral surface or an inner peripheral surface of the conic shape or the columnar shape, and has a light-shielding means at the outer peripheral surface or the inner peripheral surface having the conic shape or the columnar shape, the plurality of diffusion transmission members may be configured to transmit a plurality of light rays emitted to a plurality of portions on the intersection line while diffusing the plurality of light rays in the virtual plane, and the light-shielding means may be configured to generate the plurality of diffused light rays by shielding part of light rays transmitted through the plurality of diffusion transmission members.

In this case, the plurality of diffused light rays having the center lines passing through the first viewing area are generated by the plurality of diffusion transmission members and the light-shielding means of the light ray controller.

(5) A circular second viewing area may be predefined to surround the center axis of the light ray controller at a position that is farther upward than the reference plane, farther outward than the light ray controller and different from the first viewing area, and the light-shielding means may be configured to be switchable between a first light-shielding state and a second light-shielding state, the first light-shielding state being a state where the light-shielding means shields part of light rays transmitted through the diffusion transmission member such that center lines of a plurality of diffused light rays transmitted through the plurality of portions pass through an intersection point of the virtual plane and the first viewing area, and the second light-shielding state being a state where the light-shielding means shields part of light rays transmitted through the diffusion transmission member such that the center lines of the plurality of diffused light rays transmitted through the plurality of portions pass through an intersection point of the virtual plane and the second viewing area.

In this case, when the light-shielding means is in the first light-shielding state, the observer whose eyes are in the first viewing area can view the accurate three-dimensional image. Further, when the light-shielding means is in the second light-shielding state, the observer whose eyes are in the second viewing area can view the accurate three-dimensional image.

Advantageous Effects of Invention

The present invention enables the observers to view the accurate three-dimensional image while preventing an increase in cost.

BRIEF DESCRIPTION OF THE DRAWINGS

FIG. 12 is a schematic cross sectional view for explaining an example of use of a three-dimensional display for which a plurality of viewing areas are defined.

DESCRIPTION OF EMBODIMENTS

[1] First Embodiment (1) Basic Configuration of Three-Dimensional Display

Figure 1:
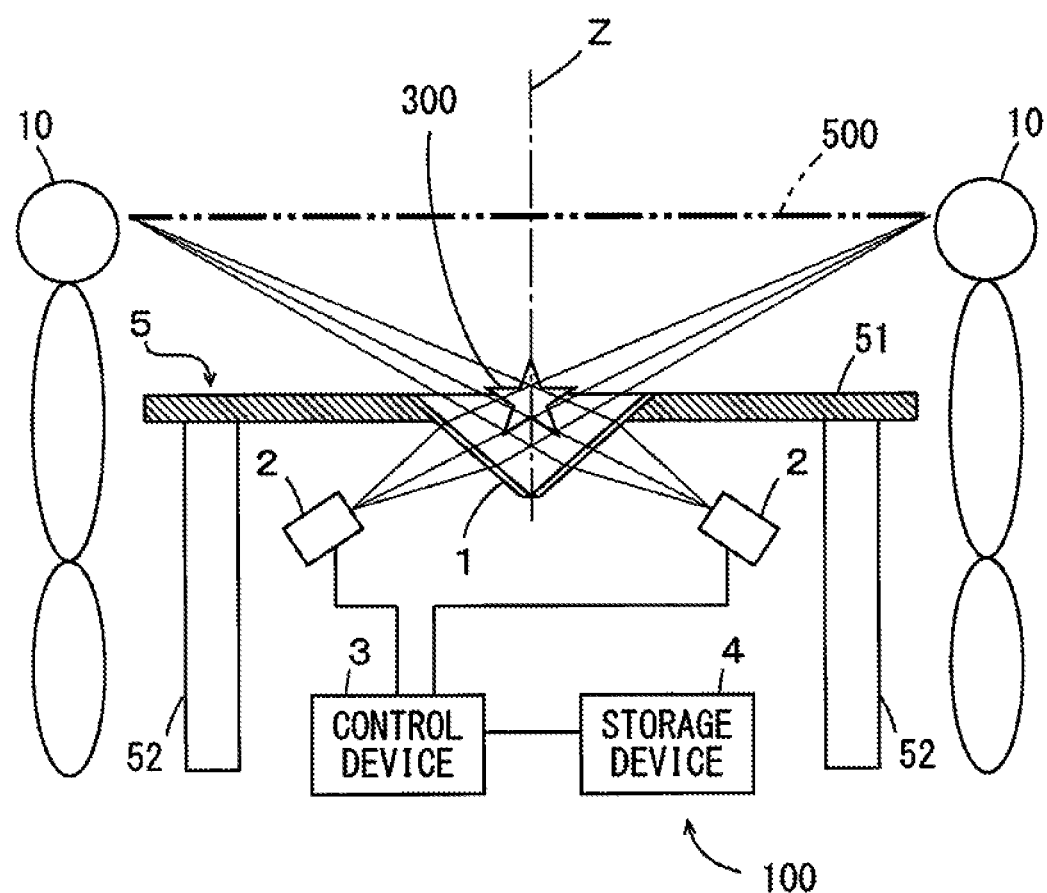
FIG. 1 is a schematic cross sectional view of a three-dimensional display according to a first embodiment.
Figure 2:
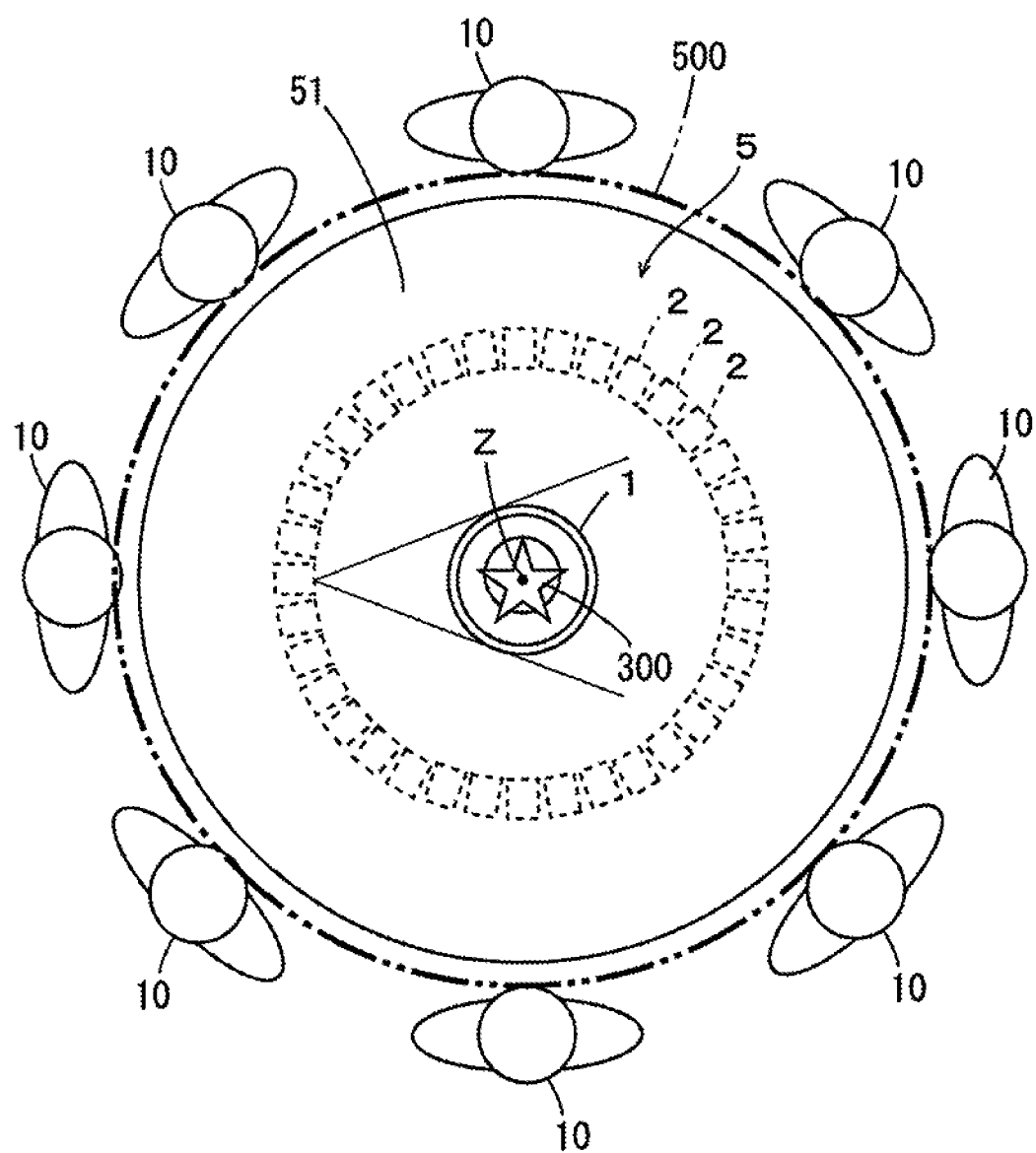
FIG. 2 is a schematic plan view of the three-dimensional display of FIG. 1.
Figure 3:
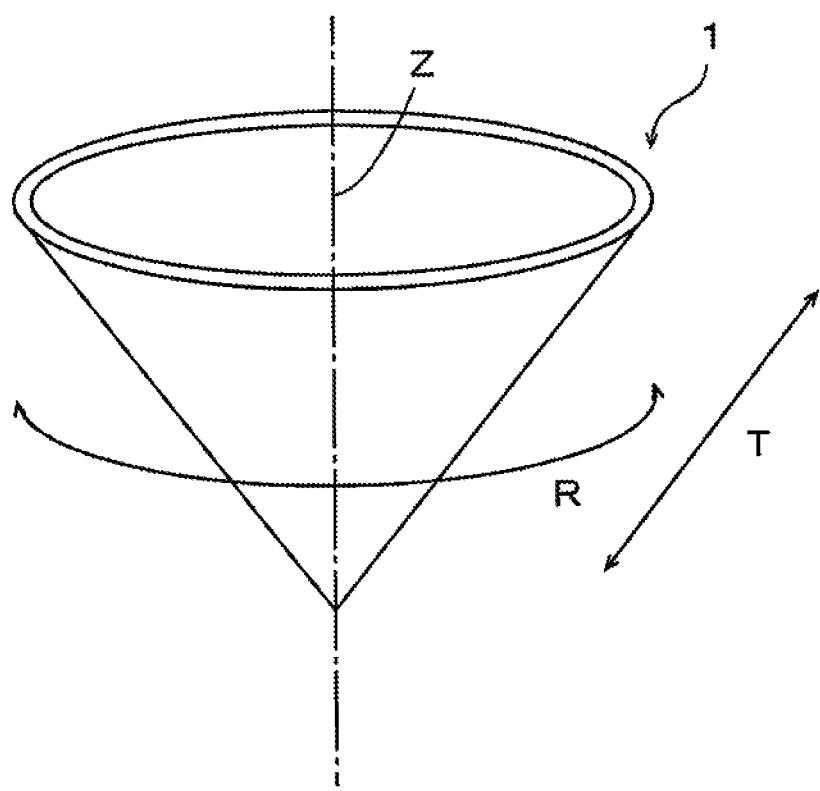
FIG. 3 is a perspective view of a light ray controller used in the three-dimensional display of FIGS. 1 and 2.

A three-dimensional display according to a first embodiment of the present invention will be described with reference to drawings. FIG. 1 is a schematic cross sectional view of the three-dimensional display according to the first embodiment. FIG. 2 is a schematic plan view of the three-dimensional display of FIG. 1. FIG. 3 is a perspective view of a light ray controller used in the three-dimensional display of FIGS. 1 and 2.

The three-dimensional display 100 is constituted by the light ray controller 1, a plurality of light ray generators 2, a control device 3 and a storage device 4. Further, the three-dimensional display 100 is provided at a table 5. The table 5 is made of a circular top board 51 and a plurality of legs 52. A circular hole is formed in the center portion of the top board 51.

As shown in FIG. 3, the light ray controller 1 has a conic shape that is rotationally-symmetric with an axis Z as the center. The base of the light ray controller 1 is open. The light ray controller 1 is basically formed such that an incident light ray is diffused in any virtual plane including the axis Z to be transmitted, and is formed such that an incident light ray is not diffused in a circumferential direction R (a direction orthogonal to the virtual plane) with the axis Z as the center and travels in a straight line to be transmitted. Details of the light ray controller 1 will be described below.

As shown in FIG. 1, the light ray controller 1 is fitted into the circular hole in the top board 51 such that the base opening is directed upward. Observers 10 who are around the table 5 can observe an inner peripheral surface of the light ray controller 1 obliquely from above the top board 51 of the table 5.

As shown in FIG. 2, the plurality of light ray generators 2 are arranged below the table 5 on a circumference with the axis Z of the light ray controller 1 as the center. The plurality of light ray generators 2 are provided to emit light rays to an outer peripheral surface of the light ray controller 1 obliquely from below the light ray controller 1. Each light ray generator 2 can emit light rays and deflect the light rays in a horizontal plane and a vertical plane. Thus, each light ray controller 2 can scan an outer peripheral surface of the light ray controller 1 with the light rays. Here, a light ray refers to the light ray that is not diffused and is indicated by a straight line. Further, in the following description, the light rays, which are generated when a light ray is transmitted through the light ray controller 1 and diffused in any virtual plane including the axis Z, are referred to as diffused light rays.

The storage device 4 of FIG. 1 is made of a hard disk drive and a memory card, for example. Three-dimensional data for presenting a three-dimensional image 300 is stored in the storage device 4. The control device 3 is made of a personal computer, for example. The control device 3 controls the plurality of light ray generators 2 based on the three-dimensional data stored in the storage device 4. Thus, the three-dimensional image 300 is presented above the light ray controller 1.

In the three-dimensional display 100, the area in which eyes of the observer 10 are to be positioned when the observers 10 observe the three-dimensional image 300 is predefined as a viewing area 500. The viewing area 500 has a specific positional relationship with the light ray controller 1 and the plurality of light ray generators 2. As shown in FIGS. 1 and 2, the viewing area 500 of the present example is defined to be circular and surround the light ray controller 1 at a position farther upward than the top board 51. The observers 10 can view the accurate three-dimensional image 300 by moving lines of sight towards the light ray controller 1 with their eyes in the viewing area 500.

(2) Light Ray Controller

In the following description, the straight line that passes through a peak position of the light intensity distribution in a cross section orthogonal to the traveling direction of one diffused light ray is referred to as a center line of the diffused light ray. When the diffused light ray is taken as a divergent pencil of light rays, the center line of the diffused light ray can be taken as a principle ray. Before the light ray controller 1 according to the present embodiment is explained, the example where the three-dimensional image 300 is displayed using a conventional light ray controller is explained.

Figure 4:
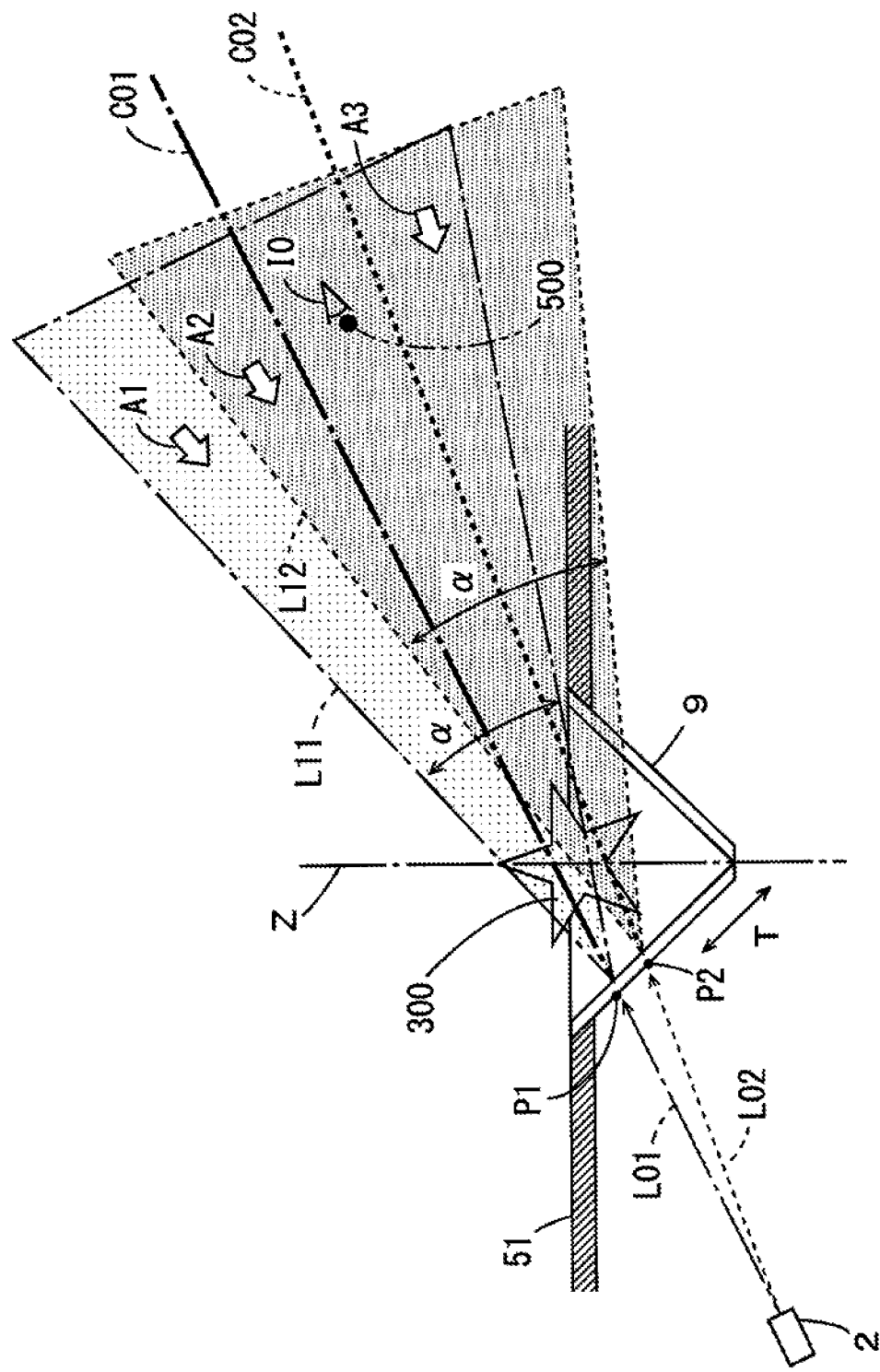
FIG. 4 is a cross sectional view for explaining a display example of a three-dimensional image by the three-dimensional display using a conventional light ray controller.

FIG. 4 is a schematic cross sectional view for explaining a display example of the three-dimensional image 300 by the three-dimensional display using the conventional light ray controller. The three-dimensional display of FIG. 4 has the same configuration as that of the three-dimensional display 100 of FIG. 1 except that a conventional light ray controller 9 is provided instead of the light ray controller 1 of FIG. 1. The light ray controller 9 basically has the same appearance and shape as those of the light ray controller 1 of FIG. 3. The cross sectional view of FIG. 4 shows the cross section on a virtual plane including the axis Z passing through the center of the light ray controller 9.

In the conventional light ray controller 9, a light ray is emitted from the light ray generator 2 to an outer peripheral surface of the light ray controller 9, whereby the light ray is transmitted while being diffused in the virtual plane. Thus, the diffused light ray that is diffused at a certain angle α in the virtual plane from the light ray controller 9 is generated. At this time, the center line of the generated diffused light ray extends on an extending line of the light ray from which the diffused light ray is generated.

In FIG. 4, a light ray L01 that is incident on a portion P1 of the light ray controller 9 and a diffused light ray L11 that is generated when the light ray L01 is transmitted through a portion P1 is indicated by an one-dot and dash line. Further, a center line C01 of the diffused light ray L11 is indicated by a thick one-dot and dash line. Further, a light ray L02 that is incident on a portion P2 of the light ray controller 9 and a diffused light ray L12 that is generated when the light ray L02 is transmitted through the portion P2 are indicated by dotted lines. Further, a center line C02 of the diffused light ray L12 is indicated by a thick dotted line. Further, the ranges in which the diffused light rays L11, L12 diverge are indicated by two types of dotted patterns having different darkness. The two portions P1, P2 are located at positions different from each other in a ridge line direction T of the light ray controller 9. One pixel that constitutes the three-dimensional image 300 is presented to the observers 10 by the diffused light ray L11. Another pixel that constitutes the three-dimensional image 300 is presented to the observers 10 by the diffused light ray L12.

In this case, the nearer their eyes 10 are to the center line C01 of the diffused light ray L11, the more clearly the observers 10 view the pixel displayed based on the light ray L01. The farther their eyes 10 are from the center line C01 of the diffused light ray L11, the less clearly the observers 10 view the pixel displayed based on the light ray L01. When their eyes 10 are outside of the range of the diffused light ray L11, the observers 10 cannot view the pixel displayed based on the light ray L01.

Further, the nearer their eyes 10 are to the center line C02 of the diffused light ray L12, the more clearly the observers 10 view the pixel displayed based on the light ray L02. The farther their eyes 10 are from the center line C02 of the diffused light ray L12, the less clearly the observers 10 view the pixel displayed based on the light ray L02. When their eyes 10 are outside of the range of the diffused light ray L12, the observers 10 cannot view the pixel displayed based on the light ray L02.

It is necessary for the diffused light rays L11, L12 generated from the light rays L01, L02 to be incident on the eyes 10 of the observers 10 in order for the observer 10 to view a plurality of pixels of the three-dimensional image 300 shown by the light rays L01, L02. In the example of FIG. 4, the viewing area 500 is present in the area where the two diffused light rays L11, L12 overlap with each other.

As indicated by an outlined arrow A1 in FIG. 4, when the eyes 10 of the observer 10 are outside of the range of the diffused light ray L12, the observer 10 cannot view the pixel displayed based on the light ray L02. Therefore, the observer 10 views an incomplete three-dimensional image 300 with a missing portion.

Further, with the above-mentioned configuration, the farther the center lines C01, C02 are from the light ray controller 1, the larger the distance between the center lines C01, C02 of the plurality of diffused light rays generated by the light ray controller 9 is. Thus, the area from which the three-dimensional image 300 that is displayed based on the plurality of light rays emitted to the light ray controller 9 can be viewed is significantly large.

In this case, as indicated by an outlined arrow A2 in FIG. 4, even in the case where the eyes 10 of the observer 10 are in the area where the diffused light rays L11, L12 overlap with each other, when the eyes 10 largely deviate from the center line C02 of the one diffused light ray L12, the pixel displayed based on the light ray L02 cannot be viewed accurately and clearly. Therefore, the observers 10 view the three-dimensional image 300 in which the pixel that is displayed based on the diffused light ray L12 and its vicinity are distorted.

Further, as indicated by an outlined arrow A3 in FIG. 4, even in the case where the eyes 10 of the observers 10 are in the area in which the diffused light rays L11, L12 overlap with each other, when the eyes 10 of the observer 10 largely deviate from the center line C01 of the one diffused light ray L11, the pixel displayed based on the light ray L01 cannot be viewed accurately and clearly. Therefore, the observer 10 views the three-dimensional image 300 in which the pixel displayed based on the diffused light L11 and its vicinity are distorted. In this manner, when the eyes 10 of the observers 10 are positioned in the areas indicated by the outlined arrows A2, A3, the entire three-dimensional image 300 cannot be viewed uniformly and clearly.

Figure 5:
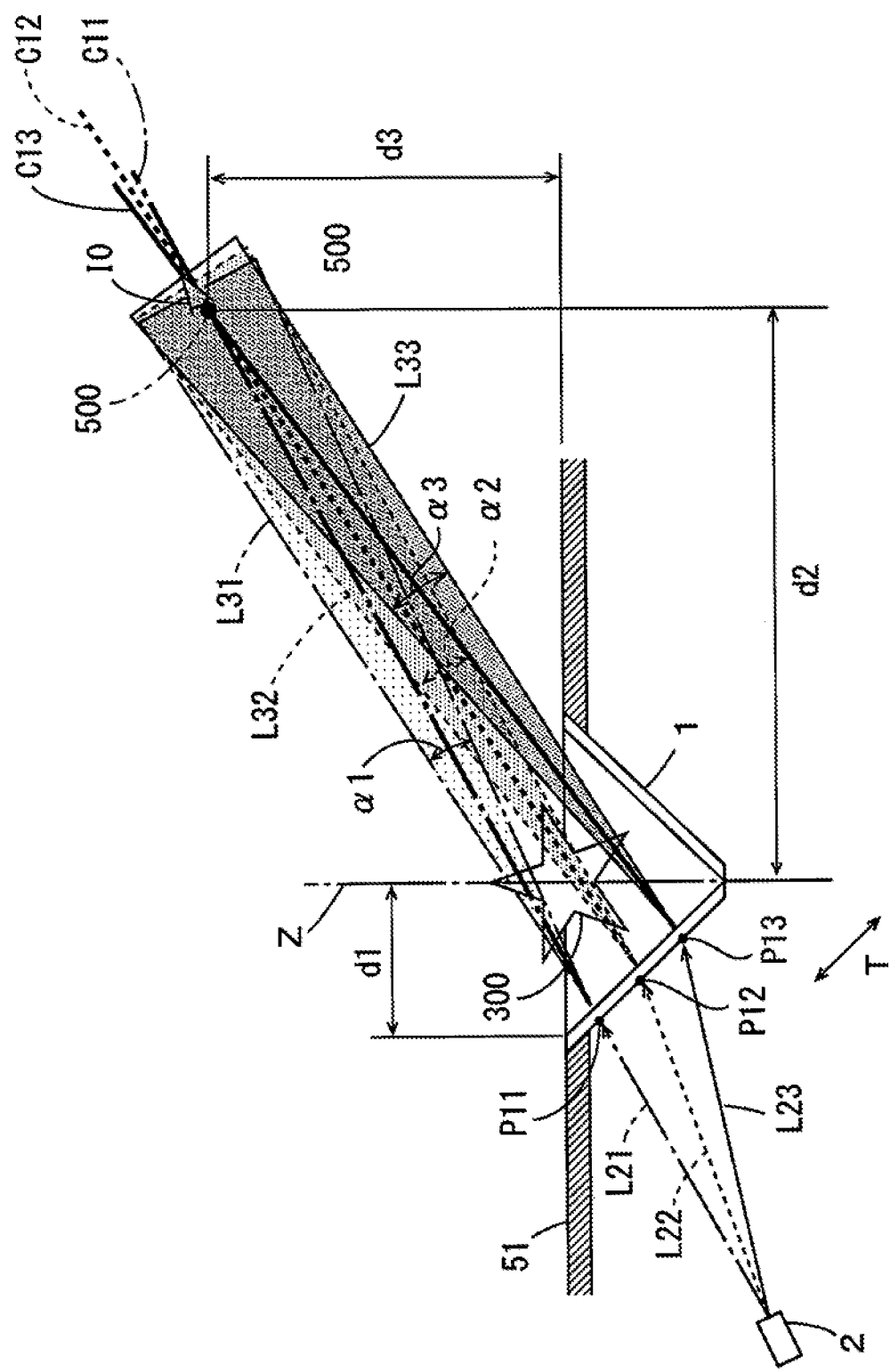
FIG. 5 is a schematic cross sectional view for explaining a display example of a three-dimensional image by the three-dimensional display using the light ray controller according to the first embodiment.

When the eyes 10 of the observers 10 are positioned in the areas indicated by the outlined arrows A2, A3, the observers 10 are viewing the incomplete but three-dimensional image 300. Therefore, the observer 10 may misidentify the incomplete three-dimensional image 300 as the complete three-dimensional image 300. FIG. 5 shows a schematic cross sectional view for explaining a display example of the three-dimensional image 300 by the three-dimensional display 100 of the first embodiment of the present invention in consideration of such a problem. This cross sectional view of FIG. 5 shows a cross section on a virtual plane including the axis Z passing though the center of the light ray controller 1.

In FIG. 5, a light ray L21 that is incident on a portion P11 of the light ray controller 1, and a diffused light ray L31 generated when the light ray L21 is transmitted through the portion P11 are indicated by one-dot and dash lines. Further, a center line C11 of the diffused light ray L31 is indicated by a thick one-dot and dash line. Furthermore, a light ray L22 that is incident on a portion P12 of the light ray controller 1, and a diffused light ray L32 generated when the light ray L22 is transmitted through the portion P12 are indicated by dotted lines. Further, a center line C12 of the diffused light ray L32 is indicated by a thick dotted line. Further, a light ray L23 that is incident on a portion P13 of the light ray controller 1, and a diffused light ray L33 generated when the light ray L23 is transmitted through the portion P13 are indicated by solid lines. Further, a center line C13 of the diffused light ray L33 is indicated by a thick solid line. Furthermore, the ranges in which the diffused light L31, L32, L33 diverge are indicated by three types of dotted patterns having darkness different from one another. The three portions P11, P12, P13 are located at positions different from one another in the ridge line direction T of the light ray controller 1.

One pixel that constitutes the three-dimensional image 300 is presented to the observer 10 by the diffused light ray L31. Another pixel that constitutes the three-dimensional image 300 is presented to the observer 10 by the diffused light ray L32. Yet another pixel that constitutes the three-dimensional image 300 is presented to the observer 10 by the diffused light ray L33.

As shown in FIG. 5, the light ray controller 1 according to the present embodiment is formed such that the plurality of light rays L21, L22, L23 that are emitted to the plurality of portions P11, P12, P13 are transmitted through the plurality of portions P11, P12, P13 while respectively being diffused in the virtual plane. Further, the light ray controller 1 is formed such that the center lines C11, C12, C13 of the plurality of diffused light rays L31, L32, L33 that have been transmitted through the plurality of portions P11, P12, P13 pass through the viewing area 500.

Further, in the light ray controller 1, diffusion angles $\alpha 1$, $\alpha 2$, $\alpha 3$ of the diffused light rays L31, L32, L33 are set such that the ranges in which the diffused light rays L31, L32, L33 diverge do not become excessively large in the viewing area 500 and its vicinity. The diffusion angles $\alpha 1$, $\alpha 2$, $\alpha 3$ may be set to a common angle, or may be set to angles different from one another.

For example, when the distances from the plurality of respective portions P11, P12, P13 to the viewing area 500 in the virtual plane are different from one another, the diffusion angles $\alpha 1$, $\alpha 2$, $\alpha 3$ are set such that the widths of all of the diffusion angles L31, L32, L33 (the width in the direction orthogonal to the traveling direction) are equal to one another at the position in the viewing area 500. When large differences are not generated among the distances from the plurality of respective portions P11, P12, P13 of the light ray controller 1 to the viewing area 500, the diffusion angles $\alpha 1$, $\alpha 2$, $\alpha 3$ may be set to the same angle.

With the above-mentioned light ray controller 1, the center lines C11, C12, C13 of the plurality of diffused light rays L31, L32, L33 that are transmitted through the light ray controller 1 in the virtual plane pass through the viewing area 500. Thus, the centers of the plurality of diffused light rays L31, L32, L33 are incident on the eyes 10 of the observer 10 in the viewing area 500 in a concentrated manner. Further, when the eyes 10 of the observer 10 slightly deviate from the viewing area 500, all of the plurality of diffused light rays L31, L32, L33 are incident on the eyes 10 of the observer 10, and only part of the plurality of diffused light rays L31, L32, L33 is not incident on the eyes 10 of the observer 10.

Further, when the eyes 10 of the observer 10 are in the virtual plane, and are in the viewing area 500 or are slightly deviating from the viewing area 500, the light intensity of the plurality of diffused light rays L31, L32, L33 that are incident on the eyes 10 of the observer 10 in the viewing area 500 is substantially uniform.

Therefore, the observer 10 can view the accurate three-dimensional image 300 uniformly and clearly with the eyes 10 in the viewing area 500. Further, even when the eyes 10 are slightly deviating from the viewing area 500, the observer 10 does not view an incomplete three-dimensional image 300 with a missing portion. When the eyes 10 of the observer 10 more largely deviates from the viewing area 500, the observer 10 cannot view the three-dimensional image 300 at all. In this case, the observer 10 naturally moves to the position from which the observer 10 can view the complete three-dimensional image 300. Therefore, it is not necessary to perform a complicated process such as a process of correcting the three-dimensional image 300 according to the positions of the eyes 10 of the observer 10 in order to present the accurate three-dimensional image 300 to the observer 10. As a result, the observer 10 can view the accurate three-dimensional image 300 while an increase in cost is prevented.

With the above-mentioned configuration, suppose that a radius d1 of the base of the light ray controller 1 is 10 cm, a distance d2 from the axis Z of the light ray controller 1 to the viewing area 500 in a horizontal direction is 50 cm, and a distance d3 from an upper surface of the top board 51 to the center of the viewing area 500 in a vertical direction is 35 cm, for example. Further, suppose that the observer 10 can view the three-dimensional image 300 in the range of 10 cm in the ridge line direction T of the light ray controller 1 with the viewing area 500 as the center.

In this case, the light ray controller 1 is designed such that the center lines C11, C12, C13 of the diffused light rays transmitted through each of the portions arranged in the ridge line direction T are inclined at the angle of about 30 to 41 degrees with respect to the horizontal plane. Further, the light ray controller 1 is designed such that the diffusion angles α1, α2, α3 of the diffused light rays L31, L32, L33 transmitted through each of the portions P11, P12, P13 arranged in the ridge line direction T of the light ray controller 1 are about 10 degrees.

Figure 6:
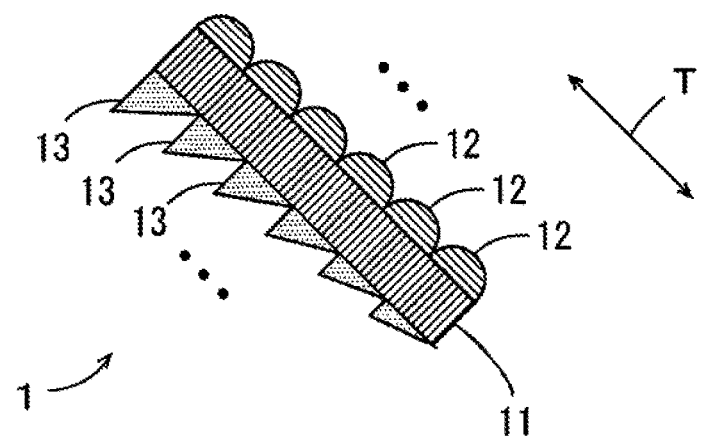
FIG. 6 is a partially enlarged cross sectional view of one example of the light ray controller.

FIG. 6 is a partially enlarged cross sectional view of one example of the light ray controller 1. The light ray controller 1 of FIG. 6 has a transparent conic light ray controller main body 11. A plurality of annular lenses 12 extending in the circumferential direction R on an inner peripheral surface of the light ray controller main body 11 are provided to be arranged closely to one another in the ridge line direction T of the light ray controller 1. Each annular lens 12 has a semi-elliptical vertical cross section and is formed in a shape of a protruding strip. The annular lens 12 may also have a semi-circular cross section. The plurality of annular lenses 12 have the function of diffusing a light ray in the virtual plane including the axis Z (see FIG. 5) of the light ray controller 1.

It is possible to adjust the diffusion angle of a light ray diffused by each annular lens 12 to the set angle by adjusting the height (thickness) of the annular lens 12 based on the inner peripheral surface of the light ray controller main body 11. For example, it is possible to reduce the diffusion angle of the light ray by increasing the height of the annular lens 12. On the other hand, it is possible to increase the diffusion angle of the light ray by reducing the height of the annular lens 12. In the present example, the plurality of annular lenses 12 have the same height. Therefore, the diffusion angles of the light rays diffused at the portions arranged in the ridge line direction T are the same.

A plurality of annular prisms 13 extending in the circumferential direction R are provided to be arranged closely to one another in the ridge line direction T of the light ray controller 1 on the outer peripheral surface of the light ray controller main body 11. Each annular prism 13 has a vertical cross section of a right triangle and is formed in a shape of a protruding strip. The cross section of the annular prism 13 may be in a shape of a triangle that is not a right triangle, or a polygon that is not a triangle. The plurality of annular prisms 13 have the function of adjusting the traveling direction of the light ray transmitted through the light ray controller 1.

It is possible to adjust the traveling direction of the light ray changed by the annular prism 13 to the set direction by adjusting an inclination angle formed by a hypotenuse in the vertical cross section of each annular prism 13 and the outer peripheral surface of the light ray controller main body 11. In the present example, inclination angles of the hypotenuses in the vertical cross section of the plurality of annular prisms 13 are different from one another. Therefore, when a plurality of light rays are respectively incident in the same direction on a plurality of portions arranged in the ridge line direction T, traveling directions of the plurality of light rays that are transmitted through the plurality of portions are different from one another.

It is possible to fabricate the light ray controller 1 of FIG. 6 by pressing a cutting blade against a transparent material made of a transparent resin having a refractive index such as acryl or polycarbonate while rotating the transparent material. Further, it is possible to fabricate the light ray controller 1 by fabricating a mold having the shape corresponding to the light ray controller 1 and filling a transparent resin such as acryl or polycarbonate in the mold. Further, the light ray controller 1 can be fabricated by a three-dimensional modeling method using an ultraviolet curing resin. Further, it is possible to fabricate the light ray controller 1 by etching the surface of a conic transparent material. Further, it is possible to fabricate the light ray controller 1 by processing the surface of a conic transparent material by laser or electric discharge. Further, it is possible to fabricate the light ray controller 1 by applying an ultraviolet curing resin to the surface of a conic transparent material and irradiating each annular area having a certain width and extending in the circumferential direction with ultraviolet rays.

In the example of FIG. 6, the plurality of annular lenses 12 are formed at the inner peripheral surface of the light ray controller main body 11, and the plurality of annular prisms 13 are formed at the outer peripheral surface of the light ray controller main body 11. However, the plurality of annular lenses 12 may be formed at the outer peripheral surface of the light ray controller main body 11, and the plurality of annular prisms 13 may be formed at the inner peripheral surface of the light ray controller main body 11. Alternatively, the plurality of annular lenses 12 and the plurality of annular prisms 13 may be formed integrally with the inner peripheral surface or the outer peripheral surface of the light ray controller main body 11. Alternatively, a sheet-like optical member (holographic optical element or the like) that can implement the functions of the plurality of annular lenses 12 and the plurality of annular prisms 13 may be provided at the inner peripheral surface or the outer peripheral surface of the light ray controller main body 11.

When the outer peripheral surface of the light ray controller 1 of FIG. 6 is irradiated with a plurality of light rays, the plurality of diffused light rays generated when the plurality of light rays are transmitted through the light ray controller 1 are diffused at a constant diffusion angle in the virtual plane including the axis Z (see FIG. 5) of the light ray controller 1 and are guided to the viewing area 500 without being diffused in the circumferential direction R.

Figure 7:
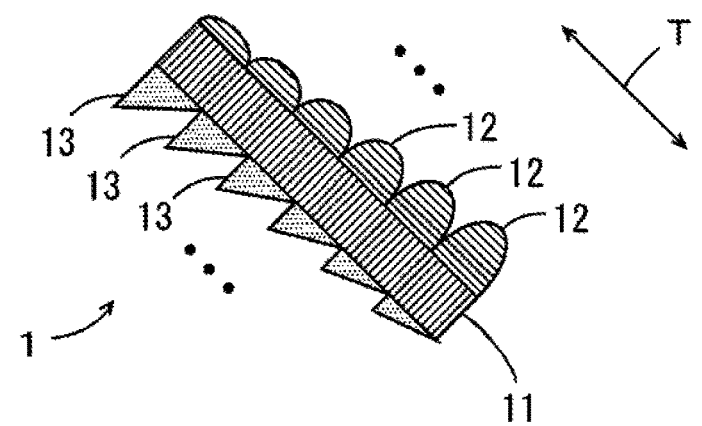
FIG. 7 is a partially enlarged cross sectional view of another example of a light ray controller.

FIG. 7 is a partially enlarged cross sectional view of another example of a light ray controller 1. The light ray controller 1 of FIG. 7 has the same configuration as that of the light ray controller 1 of FIG. 6 except that the heights (thicknesses) of a plurality of annular lenses 12 provided on the inner peripheral surface of a light ray controller main body 11 are different from one another.

With such a configuration, when the outer peripheral surface of the light ray controller 1 of FIG. 7 is irradiated with a light ray, the light ray is diffused at the diffusion angle corresponding to the height of the annular lens 12 at an irradiation position in the virtual plane including the axis Z, is transmitted in a straight line without being diffused in the circumferential direction R, and is then guided to the inside of the viewing area 500.

Figure 8:
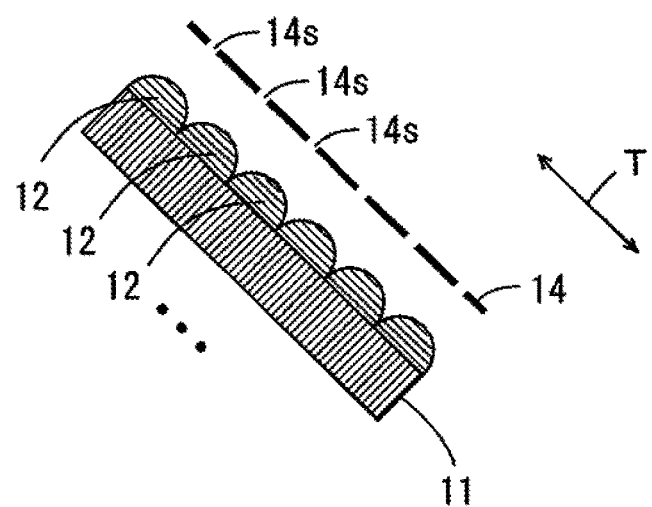
FIG. 8 is a partially enlarged cross sectional view of yet another example of a light ray controller.

FIG. 8 is a partially enlarged cross sectional view of yet another example of a light ray controller 1. In the light ray controller 1 of FIG. 8, a plurality of annular lenses 12 are provided to be arranged closely to one another in the ridge line direction T on an inner peripheral surface of a light ray controller main body 11. Further, inside of the light ray controller main body 11, a mask 14 having a plurality of annular slits 14s is provided at a certain distance from a plurality of annular lenses 12. The plurality of annular slits 14s are formed to respectively correspond to the plurality of annular lenses 12.

The mask 14 of FIG. 8 selectively shields part of diffused light rays, which are transmitted through the plurality of annular lenses 12 while being diffused from the plurality of annular lenses 12. In this case, each of the plurality of annular slits 14s functions as a pin hole, for example, in the virtual plane including the axis Z of the light ray controller 1. Thus, the light ray transmitted through each of the plurality of annular slits 14s is diffused at the angle corresponding to the size of each annular slit 14s in the virtual plane.

Therefore, the positions and the design measurements of the plurality of annular slits 14s are adjusted, so that the traveling directions and the diffusion angles of the diffused light rays transmitted through the light ray controller 1 can be adjusted.

With such a configuration, when the outer peripheral surface of the light ray controller 1 of FIG. 8 is irradiated with a light ray, the light ray is diffused at the diffusion angles corresponding to the sizes of the annular slits 14s arranged in the ridge line direction T in the virtual plane including the axis Z, are transmitted in a straight line without being diffused in the circumferential direction R and are guided to the inside of the viewing area 500.

(3) Effects

With the three-dimensional display 100 according to the present embodiment, the observer 10 can view the accurate three-dimensional image 300 uniformly and clearly with the eyes 10 in the viewing area 500. Further, the observer 10 does not view the incomplete three-dimensional image 300 with a missing portion with their eyes 10 outside of the viewing area 500. As a result, the observer 10 can view the accurate three-dimensional image 300 while an increase in cost is prevented.

[2] Second Embodiment

Figure 9:
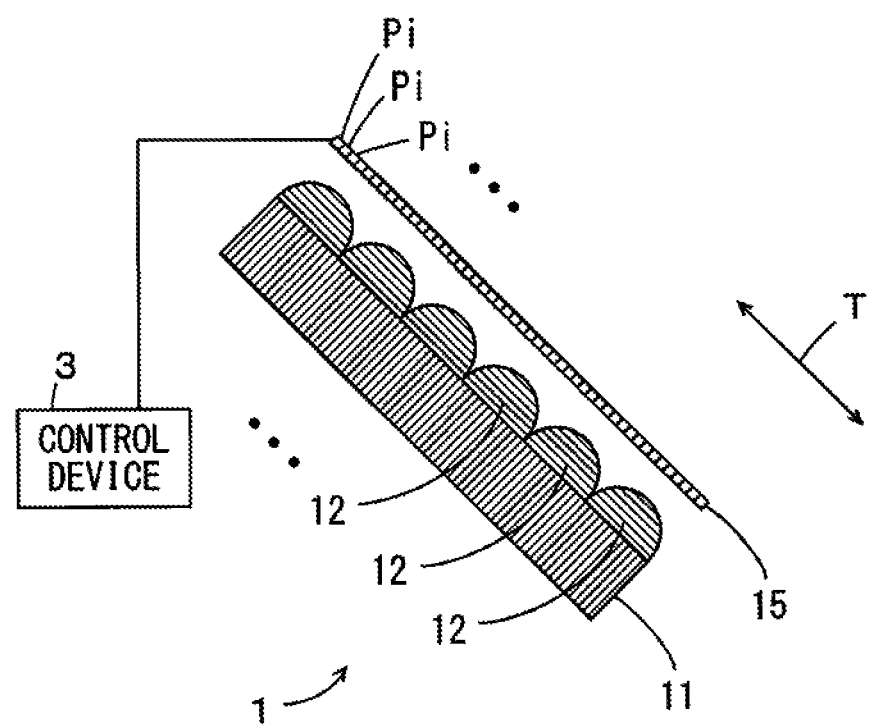
FIG. 9 is a partially enlarged cross sectional view of one example of a light ray controller used in a three-dimensional display according to a second embodiment.

As for a three-dimensional display according to the second embodiment, differences from the three-dimensional display according to the first embodiment will be described. FIG. 9 is a partially enlarged cross sectional view of one example of a light ray controller 1 used in a three-dimensional display 100 according to the second embodiment.

In the light ray controller 1 of FIG. 9, a plurality of annular lenses 12 are arranged closely to one another in the ridge line direction T on an inner peripheral surface of a light ray controller main body 11. Further, a transmission-type display panel 15 is provided inside of the light ray controller main body 11 at a certain distance from a plurality of annular lenses 12. As the display panel 15, a liquid crystal display panel or an organic EL (electroluminescence) panel, for example, can be used. The display panel 15 includes a plurality of pixels Pi arranged in the ridge line direction T of the light ray controller 1. Further, the display panel 15 is electrically connected to the control device 3 and controlled by the control device 3. It is possible to switch each pixel Pi between a light-shielding state where a light ray is not transmitted and a light-transmission state where a light ray is transmitted by changing the gradation.

With an outer peripheral surface of the light ray controller 1 irradiated with light rays, states of the plurality of pixels Pi are selectively and respectively switched. Thus, the pixels Pi in the light-shielding state and the pixels Pi in the light-transmission state are combined, so that the function similar to that of the mask 14 of FIG. 8 is implemented. For example, a plurality of pixels Pi arranged in the circumferential direction R in one area out of areas arranged in the ridge line direction T are put in the light-shielding state, whereby the light-shielding portions of the mask 14 of FIG. 8 can be formed. Further, the plurality of pixels Pi arranged in the circumferential direction R in another area in the ridge line direction T are put in the light-transmission state, so that the annular slits 14s of the mask 14 of FIG. 8 can be formed.

Figure 10:
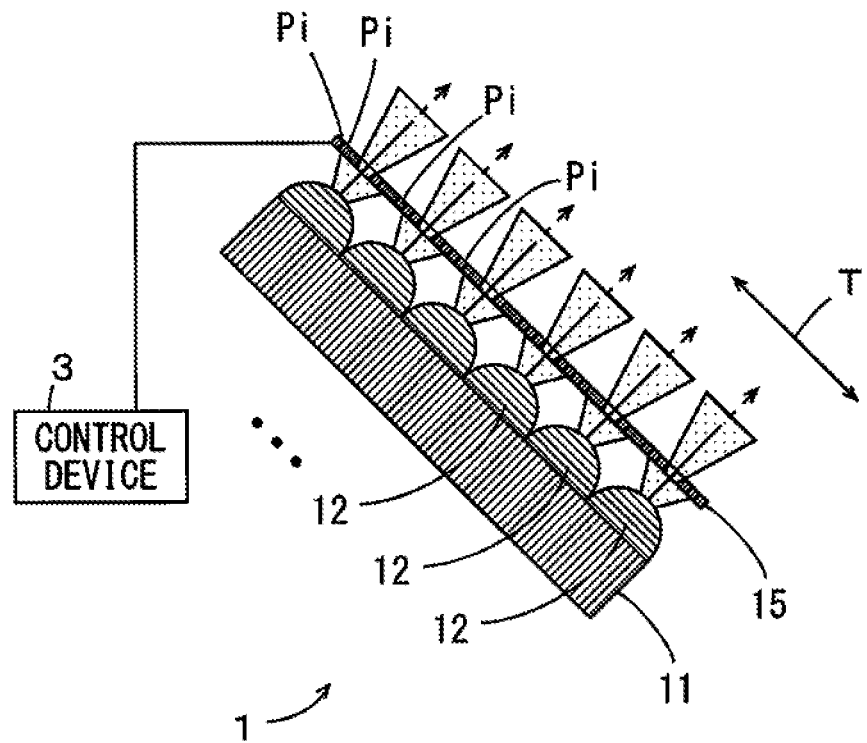
FIG. 10 is a diagram showing one example of a state of use of the light ray controller of FIG. 9.
Figure 11:
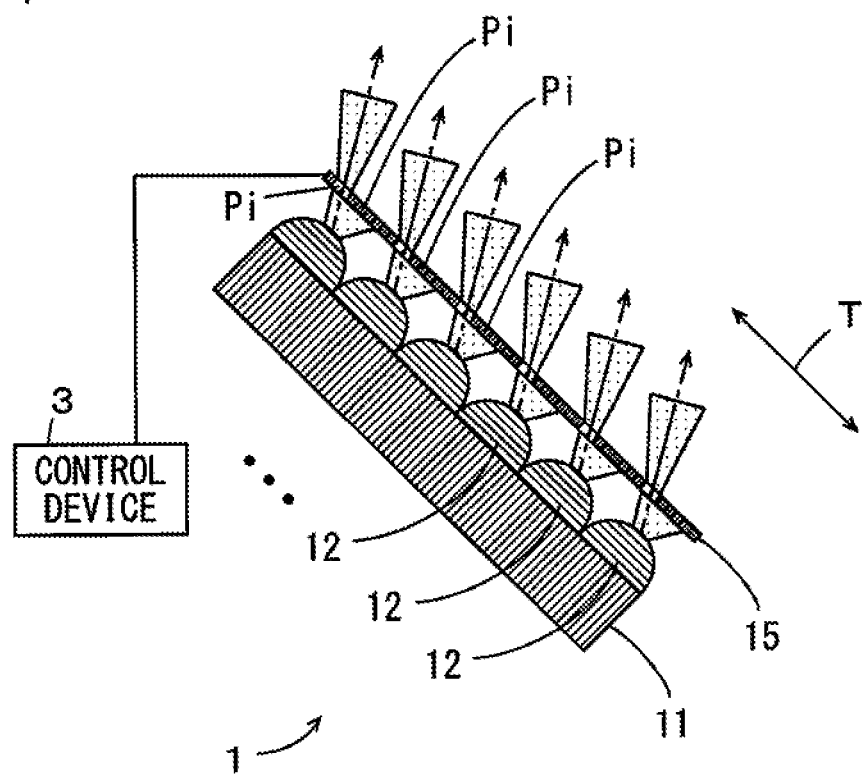
FIG. 11 is a diagram showing one example of a state of use of the light ray controller of FIG. 9.

FIGS. 10 and 11 are diagrams showing one example of states of use of the light ray controller 1 of FIG. 9. As shown in FIGS. 10 and 11, in this light ray controller 1, the states of the plurality of pixels Pi of the display panel 15 are individually controlled, whereby the traveling direction and the diffusion angle of the diffused light ray transmitted through the light ray controller 1 can be easily changed.

In the three-dimensional display 100 according to the present embodiment, a plurality of viewing areas that are different from one another can be defined. In FIGS. 10 and 11, the center lines of the diffused light rays transmitted through the light ray controller 1 are indicated by one-dot and dash arrows.

Figure 13:
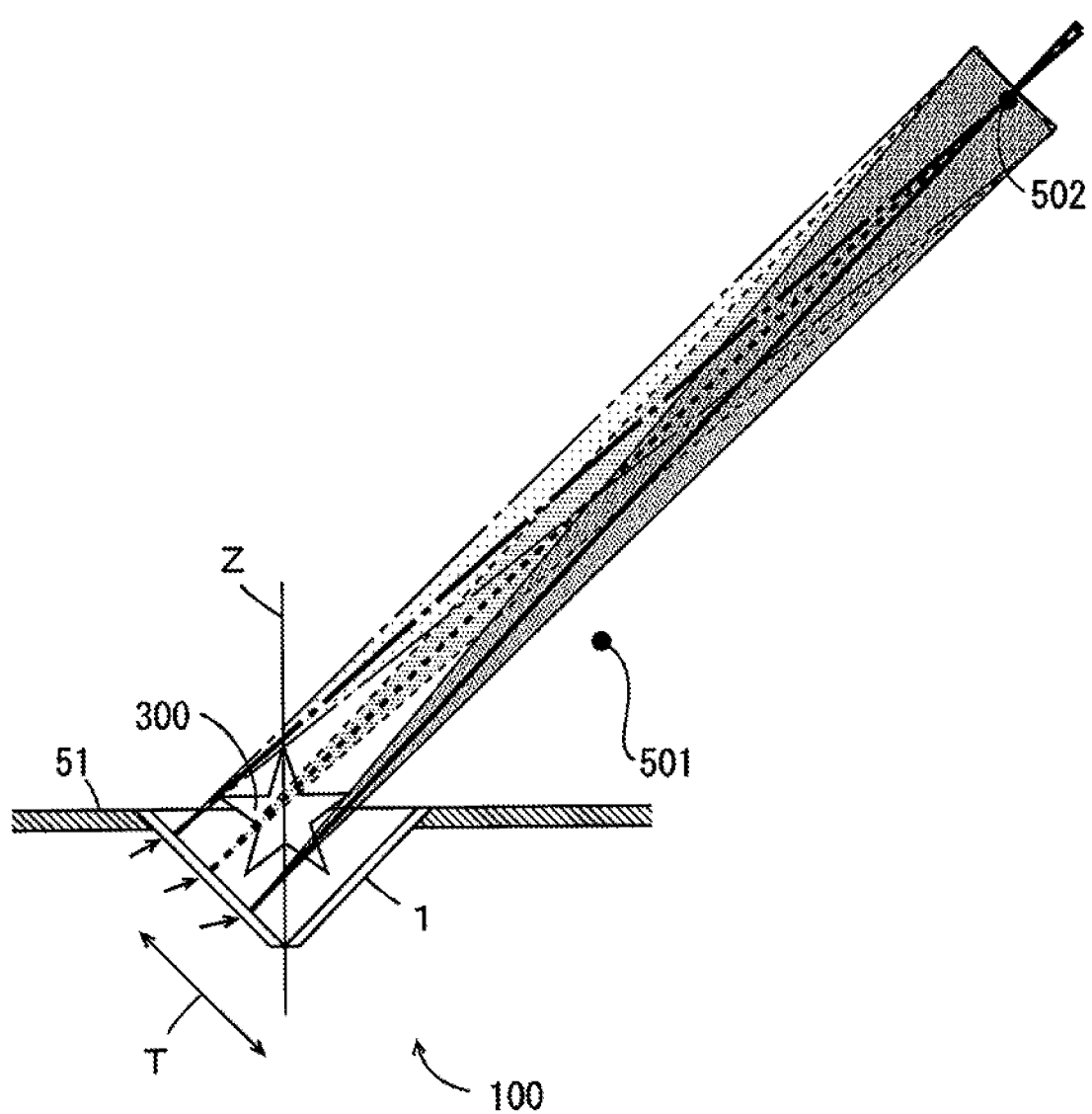
FIG. 13 is a schematic cross sectional view for explaining an example of use of a three-dimensional display for which a plurality of viewing areas are defined.

FIGS. 12 and 13 are schematic cross sectional views for explaining the examples of use of the three-dimensional display 100 for which a plurality of viewing areas are defined. A three-dimensional display 100 of the present example includes the light ray controller 1 of FIG. 9. Further, in the three-dimensional display 100 of the present example, two annular viewing areas 501, 502 are defined to surround the light ray controller 1 at a position farther upward than the top board 51. In FIGS. 12 and 13, only part of the configuration of the three-dimensional display 100 is shown.

First, in a predetermined first time period, the display panel 15 of FIG. 9 is controlled such that the center lines of the plurality of diffused light rays transmitted through the plurality of portions arranged in the ridge line direction T of the light ray controller 1 are guided to the one viewing area 501 in the virtual plane including the axis Z of the light ray controller 1 (FIG. 12). In this case, one observer 10 whose eyes 10 are in the viewing area 501 can view an accurate three-dimensional image 300.

Next, in a predetermined second time period, the display panel 15 of FIG. 9 is controlled such that the center lines of the plurality of diffused light rays transmitted through the plurality of portions arranged in the ridge line direction T of the light ray controller 1 are guided to the other viewing area 502 in the virtual plane (FIG. 13). In this case, another observer 10 whose eyes 10 are in the viewing area 502 can view an accurate three-dimensional image 300.

The display panel 15 of the light ray controller 1 of FIG. 9 is controlled using time division such that the above-mentioned process is repeated. Thus, the accurate three-dimensional image 300 can be presented to the plurality of respective viewing areas 501, 502 using one three-dimensional display 100.

In the example of FIGS. 12 and 13, the one viewing area 501 is set at a position nearer (lower) to the top board 51 than the other viewing area 502. In this case, eyes of children who are short are guided to the one viewing area 501, and eyes of adults who are tall are guided to the other viewing area 502, for example. Thus, the children and adults who have different heights can view the accurate three-dimensional image 300 substantially simultaneously.

Alternatively, the eyes of an observer 10 who is seated on a chair are guided to the one viewing area 501, and the eyes of an observer 10 who is standing behind the chair are guided to the other viewing area 502. Thus, the plurality of observers 10 in different postures can view the accurate three-dimensional image 300 substantially simultaneously.

With the configuration of FIG. 9, yet another display panel 15 may be provided inside of the display panel 15. In this case, the states of the plurality of pixels Pi of the two display panels 15 are individually switched, whereby the traveling directions and the diffusion angles of the diffused light rays transmitted through the light ray controller 1 can be adjusted more specifically.

[3] Other Embodiments (1) While the light ray controller 1 is conic in the above-mentioned embodiment, the present invention is not limited to this. The light ray controller 1 may be frustoconical or cylindrical. Also in these cases, the viewing area 500 is defined to be circular to surround the light ray controller 1 when being viewed in the direction of the center axis of the light ray controller 1 similarly to the above-mentioned embodiment.

(2) While the plurality of light ray generators 2 used in the three-dimensional display 100 are fixed to the circumference with the axis Z of the light ray controller 1 as the center below the table 5 in the above-mentioned embodiment, the present invention is not limited to this.

A rotation mechanism for cyclically rotating the plurality of light ray generators 2 in a certain period with the axis Z as the center axis may be provided below the table 5. In this case, each light ray generator 2 can allow light rays to respectively scan a plurality of portions in the circumferential direction R in the light ray controller 1. As such, the control device 3 controls each light ray generator 2 using time division according to the rotation speeds of the plurality of light ray generators 2 rotated by the rotation mechanism, thereby displaying the three-dimensional image 300 based on the three-dimensional data in the space above the light ray controller 1.

With this configuration, the number of light ray generators 2 used in the three-dimensional display 100 can be reduced. Further, because each light ray generator 2 irradiates the outer peripheral surface of the light ray controller 1 with a light ray group while rotating, even when there are few light ray generators 2, the continuous three-dimensional image 300 without a missing portion in the circumferential direction R is presented.

[4] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the three-dimensional image 300 is an example of a three-dimensional image, the three-dimensional display 100 is an example of a three-dimensional display, the light ray controller 1 is an example of a light ray controller, the plurality of light ray generators 2 are an example of a light ray generator and the control device 3 and the storage device 4 are examples of a control means.

Further, the viewing areas 500, 501 are examples of a first viewing area, the portions P11, P12, P13 of the light ray controller 1 are an example of a plurality of portions on the intersection line of the virtual plane and the light ray controller, the light rays L21, L22, L23 are an example of a plurality of light rays, the diffused light rays L31, L32, L33 are an example of a plurality of diffused light rays and the center lines C11, C12, C13 are an example of center lines of a plurality of diffused light rays.

Further, the plurality of annular lenses 12 and the plurality of annular prisms 13 are examples of a plurality of protruding strips, the plurality of annular lenses 12 are an example of a plurality of diffusion transmission members, the mask 14 and the display panel 15 are examples of a light-shielding means, and the viewing area 502 is an example of a second viewing area.

Further, the state of the display panel 15 of FIG. 9 in the case where the diffused light ray from the light ray controller 1 is guided to the viewing area 501 in FIG. 12 is an example of a first light-shielding state, and the state of the display panel 15 of FIG. 9 in the case where the diffused light ray from the light ray controller 1 is guided to the viewing area 502 in FIG. 13 is an example of a second light-shielding state.

As each of constituent elements recited in the claims, various other elements having configurations or functions described in the claims can be also used.

INDUSTRIAL APPLICABILITY

The present invention can be effectively utilized for various three-dimensional displays that display three-dimensional images.

The invention claimed is:

1. A three-dimensional display for presenting a three-dimensional image based on three-dimensional data, comprising:
   a light ray controller that has a conic shape or a columnar shape, and is arranged such that a base of the conic shape or the columnar shape is open on a reference plane;
   a light ray generator that is arranged to emit a light ray group including a plurality of light rays to an outer peripheral surface of the light ray controller from below the reference plane and outside of the light ray controller; and a controller that controls the light ray generator such that a three-dimensional image is presented by the light ray group generated by the light ray generator based on the three-dimensional data, wherein
a circular first viewing area is predefined to surround a center axis of the light ray controller at a position farther upward than the reference plane and further outward than the light ray controller, and
the light ray controller is formed such that a plurality of light rays emitted to a plurality of different portions on an intersection line of any virtual plane including the center axis and the light ray controller are transmitted through the plurality of portions while respectively being diffused in the virtual plane, and is formed such that center lines of a plurality of transmitted diffused light rays pass through an intersection point of the virtual plane and the first viewing area.

2. The three-dimensional display according to claim 1, wherein
the center line of each diffused light ray is a straight line passing through a peak position of light intensity distribution in a cross section that is orthogonal to a traveling direction of the diffused light ray.

3. The three-dimensional display according to claim 1, wherein
the light ray controller has a plurality of protruding strips that are formed to extend in a circumferential direction of the light ray controller and be arranged in a ridge line direction of the light ray controller at at least one of the outer peripheral surface and an inner peripheral surface that have the conic shape or the columnar shape, and
the plurality of protruding strips respectively generate the plurality of diffused light rays while transmitting the plurality of light rays emitted to the plurality of portions on the intersection line.

4. The three-dimensional display according to claim 1, wherein
the light ray controller has a plurality of diffusion transmission members formed to extend in a circumferential direction of the light ray controller and be arranged in a ridge line direction of the light ray controller at the outer peripheral surface or an inner peripheral surface of the conic shape or the columnar shape, and has a light-shield at the outer peripheral surface or the inner peripheral surface having the conic shape or the columnar shape,
the plurality of diffusion transmission members are configured to transmit a plurality of light rays emitted to a plurality of portions on the intersection line while diffusing the plurality of light rays in the virtual plane, and
the light-shield is configured to generate the plurality of diffused light rays by shielding part of light rays transmitted through the plurality of diffusion transmission members.

5. The three-dimensional display according to claim 4, wherein
a circular second viewing area is predefined to surround the center axis of the light ray controller at a position that is farther upward than the reference plane, farther outward than the light ray controller and different from the first viewing area, and
the light-shield is configured to be switchable between a first light-shielding state and a second light-shielding state, the first light-shielding state being a state where the light-shield shields part of light rays transmitted through the diffusion transmission member such that center lines of a plurality of diffused light rays transmitted through the plurality of portions pass through an intersection point of the virtual plane and the first viewing area, and the second light-shielding state being a state where the light-shield shields part of light rays transmitted through the diffusion transmission member such that the center lines of the plurality of diffused light rays transmitted through the plurality of portions pass through an intersection point of the virtual plane and the second viewing area.

* * * * *